US011228938B2

(12) United States Patent
Sun et al.

(10) Patent No.: US 11,228,938 B2
(45) Date of Patent: Jan. 18, 2022

(54) DATA TRANSMISSION METHOD, APPARATUS, NETWORK-SIDE DEVICE, TERMINAL, AND COMPUTER-READABLE STORAGE MEDIUM

(71) Applicants: China Mobile Communication Co., Ltd Research Institute, Beijing (CN); China Mobile Communications Group Co., Ltd., Beijing (CN)

(72) Inventors: Junshuai Sun, Beijing (CN); Yingying Wang, Beijing (CN); Xueyan Huang, Beijing (CN); Xingyu Han, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 0 days.

(21) Appl. No.: 16/633,779

(22) PCT Filed: Jun. 14, 2018

(86) PCT No.: PCT/CN2018/091306
§ 371 (c)(1),
(2) Date: Jan. 24, 2020

(87) PCT Pub. No.: WO2019/029265
PCT Pub. Date: Feb. 14, 2019

(65) Prior Publication Data
US 2020/0245183 A1  Jul. 30, 2020

(51) Int. Cl.
*H04W 28/02* (2009.01)
*H04W 76/12* (2018.01)
(Continued)

(52) U.S. Cl.
CPC ... *H04W 28/0268* (2013.01); *H04W 28/0263* (2013.01); *H04W 28/24* (2013.01); *H04W 76/12* (2018.02); *H04W 80/08* (2013.01)

(58) Field of Classification Search
CPC .............. H04W 28/02; H04W 28/0263; H04W 28/0268; H04W 28/24; H04W 76/00;
(Continued)

(56) References Cited

U.S. PATENT DOCUMENTS 10,409,682 B1 * 9/2019 Davies ................ G06F 11/1088
2004/0033801 A1 * 2/2004 Yi ........................... H04L 69/04
455/428

(Continued)

FOREIGN PATENT DOCUMENTS

CN     102612095 A     7/2012
CN     103959884 A     7/2014
(Continued)

OTHER PUBLICATIONS

Chinese Office Action (First) dated Feb. 27, 2020, for Chinese Patent Application No. 201710672259.4, 5 pages.
(Continued)

Primary Examiner — Nathan S Taylor
(74) Attorney, Agent, or Firm — Morgan, Lewis & Bockius LLP

(57) ABSTRACT

A data transmission method, a data transmission apparatus, a network-side device, a terminal, and a computer-readable storage medium are provided. The data transmission method includes selecting, according to QoS requirement of a downlink upper-layer data stream, a lower-layer bearer from a bearer set established for the upper-layer data stream, the bearer set including at least two lower-layer bearers; and mapping the upper-layer data stream onto a selected lower-layer bearer for transmission.

20 Claims, 7 Drawing Sheets

(51) Int. Cl.
*H04W 28/24* (2009.01)
*H04W 80/08* (2009.01)

(58) Field of Classification Search
CPC ... H04W 76/12; H04W 80/08; H04W 72/087; H04W 72/1236; H04W 72/1268; H04W 72/1273; H04W 72/08; H04W 72/12; H04W 76/15
See application file for complete search history.

(56) References Cited

U.S. PATENT DOCUMENTS

| | | | | |
|---|---|---|---|---|
| 2005/0238051 | A1* | 10/2005 | Yi | H04L 1/189 370/469 |
| 2013/0107718 | A1* | 5/2013 | Edara | H04W 28/0268 370/236 |
| 2014/0269632 | A1* | 9/2014 | Blankenship | H04W 76/15 370/336 |
| 2014/0344810 | A1* | 11/2014 | Wang | G06F 9/5083 718/1 |
| 2015/0071059 | A1* | 3/2015 | Fu | H04L 47/2408 370/230 |
| 2015/0264631 | A1* | 9/2015 | Zhang | H04W 48/08 370/329 |
| 2016/0174155 | A1* | 6/2016 | Nagata | H04W 52/02 370/311 |
| 2016/0286412 | A1* | 9/2016 | Kim | H04W 72/0406 |
| 2016/0373958 | A1* | 12/2016 | Cao | H04W 28/0268 |
| 2017/0105227 | A1* | 4/2017 | Pinheiro | H04W 72/087 |
| 2017/0181185 | A1* | 6/2017 | Lee | H04W 80/02 |
| 2017/0332422 | A1* | 11/2017 | Ohta | H04W 72/1278 |
| 2018/0035440 | A1* | 2/2018 | Ohta | H04W 88/06 |
| 2019/0029057 | A1* | 1/2019 | Pan | H04W 28/12 |
| 2019/0150023 | A1* | 5/2019 | Cho | H04W 28/0263 370/235 |

FOREIGN PATENT DOCUMENTS

| | | |
|---|---|---|
| CN | 104427572 A | 3/2015 |
| CN | 105230086 A | 1/2016 |
| CN | 106537857 A | 3/2017 |

OTHER PUBLICATIONS

English Translation of Chinese Office Action (First) dated Feb. 27, 2020, for Chinese Patent Application No. 201710672259.4, 6 pages.
R2-165024, 3GPP TSG-RAN2 Meeting #95, Gothenburg, Sweden, Aug. 22-26, 2016, Agenda item 9.4.2.2, 6 pages.
R2-165404, 3GPP TSG-RAN2#95, Gothenburg, Sweden, Aug. 22-26, 2016, Agenda item 9.4.2.2, 3 pages.
R2-1707031, 3GPP TSG-RAN WG2 Meeting Ad hoc, Qingdao, China, Jun. 27-29, 2017, Agenda item 10.2.13, 3 pages.
R2-1707035 (revision of R2-1704801), 3GPP TSG-RAN WG2 Meeting Ad hoc, Qingdao, China, Jun. 27-29, 2017, Agenda item 10.3.4.3, 4 pages.
R2-1707161, 3GPP TSG-RAN WG2#98-AH, Qingdao, China, Jun. 27-29, 2017, Agenda item 10.3.4.3, 7 pages.
R5-081200, 3GPP TSG-RAN WG5 Meeting #39, Kansas City, US, May 5-9, 2008, Agenda item 6.4.7.1, 5 pages.
Chinese International Search Report with Written Opinion dated Feb. 20, 2020, for PCT/CN2018/091306, 9 pages.
International Preliminary Report on Patentability with Written Opinion (in English) dated Feb. 20, 2020, for PCT/CN2018/091306, 6 pages.
R2-1706786, 3GPP TSG-RAN WG2 Meeting Adhoc#2, Qingdao, China, Jun. 27-29, 2017, Agenda item: 10.3.4.3, pp. 4.
Extended European Search Report dated Feb. 19, 2021 for European Patent Application No. 18844600.9, pp. 7.

* cited by examiner

DATA TRANSMISSION METHOD, APPARATUS, NETWORK-SIDE DEVICE, TERMINAL, AND COMPUTER-READABLE STORAGE MEDIUM

CROSS-REFERENCE TO RELATED APPLICATION

This application is a U.S. national phase application of a PCT Application No. PCT/CN2018/091306 filed on Jun. 14, 2018, which claims priority to a Chinese Patent Application No. 201710672259.4 filed in China on Aug. 8, 2017, the disclosure of which is incorporated herein by reference in its entirety.

TECHNICAL FIELD

The present disclosure relates to the field of radio communication, and more particularly, relates to a data transmission method, a data transmission apparatus, a network-side device, a terminal, and a computer-readable storage medium.

BACKGROUND

A concept of reflective mapping (fast flexible mapping) is introduced in a higher layer of a core network (CN) and a radio access layer (RAS) of a 3$^{rd}$ Generation Partnership Project (3GPP) to implement a fast mapping from an Internet Protocol (IP) Flow to a Quality of Service (QoS) Flow (a core network layer), and from the QoS Flow to a Data Bearer (DRB) between a terminal and a base station (i.e. a radio access network layer).

A key idea of the reflective mapping is that a bearer channel at a lower layer in a case that downlink data is transmitted by a network side is selected for transmission. When a correspondence end, i.e., a terminal side, receives the downlink data, the terminal side sends uplink data directly on the same bearer channel.

Although the concept of reflective mapping is introduced in both the higher layer of the core network and an access network protocol stack in a fifth generation (5G) of the 3GPP, there is no technical solution for implementing mapping (uplink) at the terminal side through downlink mapping at the network side.

SUMMARY

The present disclosure provides a data transmission method, a data transmission apparatus, a network-side device, a terminal, and a computer-readable storage medium.

In a first aspect, some embodiments of the present disclosure provide a data transmission method. The method includes: selecting, according to Quality of Service (QoS) requirement of a downlink upper-layer data stream, a lower-layer bearer from a bearer set established for the upper-layer data stream, the bearer set including at least two lower-layer bearers; mapping the upper-layer data stream onto the selected lower-layer bearer for transmission.

In the above solution, the method further includes establishing at least two lower-layer bearers for the upper-layer data stream at a lower layer according to a QoS model; and utilizing the established at least two lower-layer bearers to form the bearer set, wherein each of the lower-layer bearers corresponds to a QoS model.

In the above solution, the method further includes: updating a lower-layer bearer in a reconfiguration process and/or a deletion process according to QoS model requirement, to form a new bearer set; and selecting a new lower-layer bearer in the new bearer set, and mapping the upper-layer data stream onto the new lower-layer bearer for transmission.

In the above solution, establishing the at least two lower-layer bearers for the upper-layer data stream at the lower layer according to the QoS model, includes establishing a lower-layer bearer; and establishing at least one more lower-layer bearer through an establishment process and/or a reconfiguration process after successfully establishing the lower-layer bearer.

In the above solution, each bearer in the bearer set is a newly established bearer or a previously established bearer.

In the above solution, bearer sets corresponding to a plurality of upper-layer data streams of a same user coincide, or intersect, or are completely different.

In the above solution, selecting, according to the QoS requirement of the downlink upper-layer data stream, the lower-layer bearer from the bearer set established for the upper-layer data stream, and mapping the upper-layer data stream onto the selected lower-layer bearer for transmission, includes: selecting, according to QoS requirement of an Internet Protocol (IP) Flow, a QoS Flow from a bearer set established for the IP Flow; and mapping the IP Flow onto the selected QoS Flow for transmission.

In the above solution, selecting, according to the QoS requirement of the downlink upper-layer data stream, the lower-layer bearer from the bearer set established for the upper-layer data stream, and mapping the upper-layer data stream onto the selected lower-layer bearer for transmission, includes: selecting, according to QoS requirement of a QoS flow, a data radio bearer (DRB) between a terminal and a base station from a bearer set established for the QoS flow; and mapping the QoS flow onto the selected DRB for transmission.

In a second aspect, some embodiments of the present disclosure further provide a data transmission method. The method includes receiving a downlink upper-layer data stream on a first lower-layer bearer; determining whether or not the first lower-layer bearer is a lower-layer bearer in a bearer set established for the upper-layer data stream, the bearer set including at least two lower-layer bearers; and mapping a corresponding uplink data stream onto the first lower-layer bearer for transmission in a case that a result of the determination indicates that the first lower-layer bearer is a lower-layer bearer in the bearer set.

In the above solution, each bearer in the bearer set is a newly established bearer or a previously established bearer.

In the above solution, bearer sets corresponding to a plurality of upper-layer data streams of a same user coincide, or intersect, or are completely different.

In the above solution, the upper-layer data stream is an Internet Protocol (IP) stream, determining whether or not the first lower-layer bearer is the lower-layer bearer in the bearer set established for the upper-layer data stream, and mapping the corresponding uplink data stream onto the first lower-layer bearer for transmission in a case that the result of the determination indicates that the first lower-layer bearer is the lower-layer bearer in the bearer set, includes: determining whether or not the first lower-layer bearer is a Quality of Service (QoS) flow in a bearer set established for the IP flow; and in a case that a result of the determination indicates that the first lower-layer bearer is the QoS flow in the bearer set, mapping the corresponding uplink data stream onto the first lower-layer bearer for transmission.

In the above solution, the upper-layer data stream is a Quality of Service (QoS) stream, determining whether or not the first lower-layer bearer is the lower-layer bearer in the bearer set established for the upper-layer data stream, and mapping the corresponding uplink data stream onto the first lower-layer bearer for transmission in a case that the result of the determination indicates that the first lower-layer bearer is the lower-layer bearer in the bearer set, includes: determining whether or not the first lower-layer bearer is a Data Radio Bearer (DRB) in a bearer set established for the QoS flow; and mapping the corresponding uplink data stream onto the first lower-layer bearer for transmission, in a case that the result of the determination indicates that the first lower-layer bearer is the DRB in the bearer set.

In a third aspect, some embodiments of the present disclosure further provide a data transmission apparatus. The apparatus includes a selecting unit, configured to select, according to a Quality of Service (QoS) requirement of a downlink upper-layer data stream, a lower-layer bearer from a bearer set established for the upper-layer data stream, the bearer set including at least two lower-layer bearers; and a first sending unit, configured to map the upper-layer data stream onto the selected lower-layer bearer for transmission.

In a fourth aspect, some embodiments of the present disclosure further provide a data transmission apparatus. The data transmission apparatus includes a receiving unit, configured to receive a downlink upper-layer data stream on a first lower-layer bearer; a determining unit, configured to determine whether or not the first lower-layer bearer is a lower-layer bearer in a bearer set established for the upper-layer data stream, the bearer set including at least two lower-layer bearers; and a sending unit, configured to map a corresponding uplink data stream onto the first lower-layer bearer for transmission in a case that a result of the determination indicates that the first lower-layer bearer is a lower-layer bearer in the bearer set.

In a fifth aspect, some embodiments of the present disclosure further provide a network-side device. The device includes a first processor, a first storage, and a computer program stored on the first storage and executable by the first processor; wherein the first processor is configured to, in a case that the first processor executes the computer program, execute the steps of the method according to the first aspect.

In a sixth aspect, some embodiments of the present disclosure further provide a terminal. The terminal includes a second processor, a second storage, and a computer program stored on the second storage and executable by the second processor; wherein the second processor is configured to, in a case that the second processor executes the computer program, execute the steps of the method according to the second aspect.

In a seventh aspect, some embodiments of the present disclosure further provide a computer-readable storage medium. The compute-readable storage medium includes a computer program stored on the computer-readable storage medium, wherein in a case that the computer program is executed by a processor, the processor implements the steps of the method according to the first aspect, or implements the steps of the method according to the second aspect.

In the data transmission method, the data transmission apparatus, the network-side device, the terminal, and the computer-readable storage medium provided by some embodiments of the present disclosure, the network-side device selects an appropriate lower-layer bearer from an available lower-layer bearer set according to QoS requirement of an upper-layer data stream, transmits downlink data on the selected lower-layer bearer; and the terminal receives the downlink data on the lower-layer bearer selected by the network-side device, and sends corresponding uplink data on the lower-layer bearer selected by the network-side device. Thus, reflective mapping of an inter-layer data transmission channel is realized through a configuration set, and a mapping at the terminal side is realized through a downlink mapping at the network side. In addition, a fast mapping is realized without carrying any channel-associated indication or channel-associated signaling, an overhead is reduced, and implementation of the technical solutions is simple.

BRIEF DESCRIPTION OF THE DRAWINGS

In drawings which are not necessarily drawn to scale, like reference numerals may describe like components in different ones of the drawings. The drawings generally illustrate various embodiments discussed herein by way of example, but not by way of limitation.

DETAILED DESCRIPTION

The present disclosure will now be described in further detail with reference to the accompanying drawings and embodiments.

Figure 1:
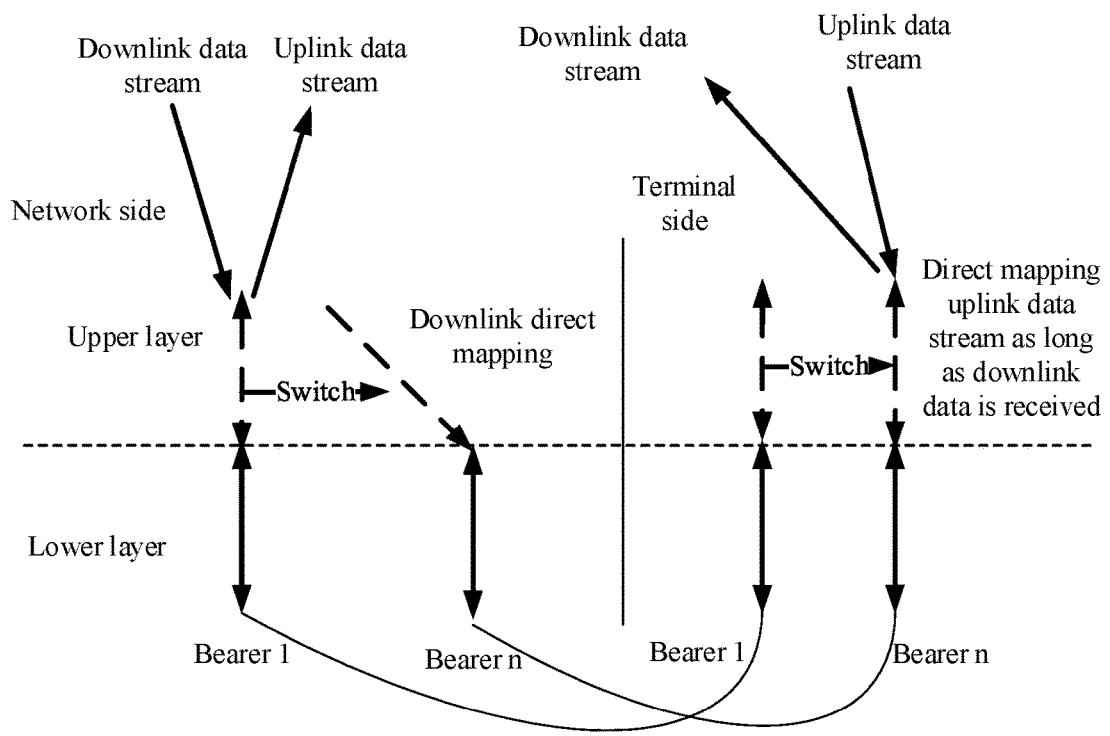
FIG. 1 is a schematic diagram of a reflective mapping procedure in the related art.

Reflective mapping is a fast inter-layer transmission channel mapping method for uplink data transmission under a control of a network-side. FIG. 1 shows a key idea of the reflective mapping. In conjunction with FIG. 1, a basic idea of the reflective mapping includes: uplink and downlink data streams (Data Flow) at an upper layer (which may be referred to as an Upper Layer) are transmitted or received on a Bearer 1 at a lower layer (which may be referred to as a Lower Layer) before a function of the reflective mapping is activated. Specifically, the network side transmits downlink data on the Bearer 1 and receives uplink data on the Bearer 1, and the terminal side receives the downlink data on the Bearer 1 and transmits the uplink data on the Bearer 1.

After the reflective mapping is started, the network side sends a downlink data stream (assuming an ID of the data stream is i) directly on a target bearer n (a source bearer is 1), and the terminal side receives data packets of the data stream having the ID of i on the bearer n. The terminal side deduces that the network side turns on the reflective mapping and a data packet of an uplink data stream to be sent by the terminal should be sent on the bearer n. Thus, in a case that the terminal receives the data packet of the downlink data stream having the ID of i on the bearer n, data packets of an uplink data stream corresponding to the downlink data stream are all transmitted on the bearer n.

In the present disclosure, each upper-layer data stream is mapped to a set of lower-layer bearers (which may be referred to as an available Bear Group), that is, the number of lower-layer bearers serving an upper-layer data stream at the same time may be more than one. The network-side device selects an appropriate lower-layer bearer from the set of available lower-layer bearers according to a QoS requirement of the upper-layer data stream, and transmits downlink data on the selected lower-layer bearer. The terminal receives the downlink data on the lower-layer bearer selected by the network-side device, and transmits uplink data corresponding to the downlink data on the lower-layer bearer selected by the network-side device.

In regard to a related lower-layer bearer, an upper-layer data stream may only be mapped onto a lower-layer bearer, but cannot be mapped onto a bearer set, that is, a bearer set cannot be formed, and an appropriate lower-layer bearer may be selected from the bearer set according to a QoS requirement. In addition, in regard to a related lower-layer bearer, a lower-layer bearer may simultaneously carry a plurality of upper-layer data streams, or may carry only one upper-layer data stream.

Technical solutions provided by some embodiments of the present disclosure include a technical solution of reflecting mapping of an inter-layer data transmission channel based on a configuration set, that is, reflecting mapping of the inter-layer data transmission channel is realized by the configuration set, thereby, mapping at the terminal side is realized through downlink mapping at the network-side.

An uplink refers to a direction in which the terminal transmits data to the network-side device, and a downlink refers to a direction in which the network-side device transmits data to the terminal. Accordingly, an uplink data stream refers to a data stream sent by the terminal to the network-side device, and a downlink data stream refers to a data stream sent by the network-side device to the terminal.

Figure 2:
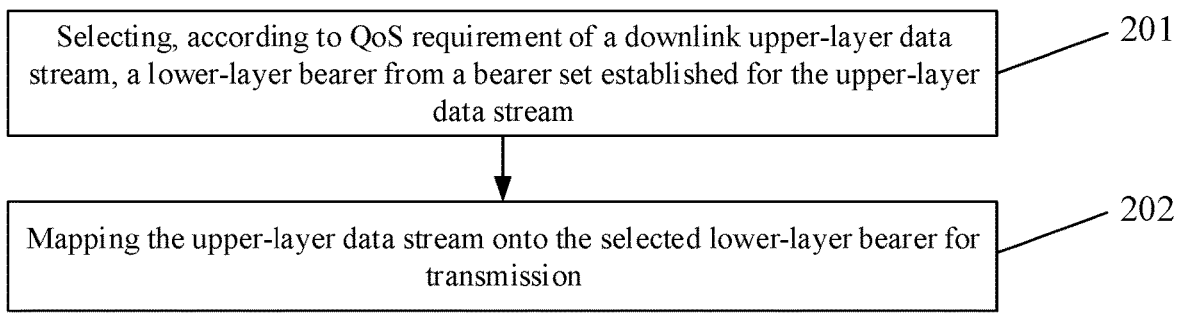
FIG. 2 is a flowchart of a data transmission method applied to a network-side device according to some embodiments of the present disclosure.

Some embodiments of the present disclosure provide a data transmission method that is applied to a network-side device. As shown in FIG. 2, the method includes steps 201-202.

Step 201: selecting, according to a QoS requirement of a downlink upper-layer data stream, a lower-layer bearer from a bearer set established for the upper-layer data stream. Here, the bearer set includes at least two lower-layer bearers.

In practical applications, bearer sets corresponding to a plurality of upper-layer data streams of the same user may coincide, intersect, or are completely different.

The coincidence and the intersection mean that there are several lower-layer bearers that may simultaneously carry multiple upper-layer data streams.

After a function of reflective mapping is started (the network-side device turns on the function of reflective mapping according to an algorithm or other instructions), the steps 201 to 202 are executed.

In practical application, in order to realize the technical solutions of some embodiments of the present disclosure, in a case that an upper layer requires a lower layer to establish a lower-layer bearer channel for an upper-layer data stream, the network side simultaneously establishes, for the upper-layer data stream to the user, more than one lower-layer bearer (at least two lower-layer bearers) at a lower layer, i.e. establishes a bearer set available to the user. Each bearer within the bearer set may be a newly established bearer or a previously existing bearer being introduced.

Based on this, in some embodiments, before performing this step 201, the method may further include establishing at least two lower-layer bearers for the upper-layer data stream at a lower layer according to a QoS model; and utilizing the established at least two lower-layer bearers to form the bearer set, wherein each of the lower-layer bearers corresponds to a QoS model. As may be seen from the above description, different lower-layer bearers being established may meet QoS requirements of different upper-layer data streams.

In practical application, the number of low-level bearers being established should be determined according to QoS models given through a system research and a simulation. For example, according to the system research and the simulation, at most eight QoS models in the lower layer needed by a user may support service quality requirements of upper-layer data streams of the user. In a case that a service is established for the user, i.e., a lower-layer bearer is established, eight bearers respectively corresponding to various QoS models may be established simultaneously.

It is also possible to establish simultaneously a part (according to systematic analysis, quality of service models most commonly used by the users), for example, 4 lower-layer bearers, of the bearers. More lower-layer bearers may be established one by one subsequently.

It is also possible to successfully establish a lower-layer bearer firstly, and then establish at least one bearer by means of establishment, reconfiguration or the like so that the number of lower-layer bearers in the bearer set may meet the QoS requirements of the data streams. That is, a lower-layer bearer is firstly established; after the lower-layer bearer is successfully established, at least one more lower-layer bearer is established through the establishment and/or the reconfiguration.

In addition, in practical application, the lower-layer bearers in the set may be updated according to the QoS model requirements of the system.

Based on this, in some embodiments, the method may further include updating a lower-layer bearer in a reconfiguration process and/or a deletion process according to QoS model requirements during a service process, to form a new bearer set; selecting a new lower-layer bearer in the new bearer set, and mapping the upper-layer data stream onto the new lower-layer bearer for transmission.

Here, the updating includes: modifying and deleting.

The modifying means adding a new lower-layer bearer to an existing bearer set or modifying or deleting an existing bearer according to the QoS model requirements of a system.

The deleting has two deletion modes. A first mode is that in a case that the bearer set has only one bearer left, the bearer set needs also to be deleted at the same time when the bearer is deleted. A second mode is that all bearers in the bearer set need to be deleted at the same time.

Each bearer in the bearer set may be a newly established bearer or may be a previously established bearer.

Step 202: mapping the upper-layer data stream onto a selected lower-layer bearer for transmission.

In practical application, inter-layer reflective mapping from an upper layer to a lower layer may include inter-layer reflective mapping of a radio access layer and inter-layer reflective mapping of a core layer (a non-radio access layer).

The inter-layer reflective mapping of the radio access layer refers to reflective mapping from a QoS Flow to a DRB, in which the network-side device refers to a base station, such as a 5G base station (gNB), or the like. The inter-layer reflective mapping of the core layer refers to reflective mapping from an IP Flow to a QoS Flow, and in such a case, the network-side device refers to a core network device.

Based on this, in some embodiments, specific implementation of the steps 201-202 includes selecting, according to a QoS requirement of the IP Flow, a QoS Flow from the bearer set established for the IP Flow; and mapping the IP Flow onto the selected QoS Flow for transmission.

In some embodiments, specific implementation of the steps 201-202 includes selecting, according to a QoS requirement of a QoS Flow, a DRB from the bearer set established for the QoS Flow; and mapping the QoS Flow onto the selected DRB for transmission.

After the network side sends the data stream out, the terminal performs an operation corresponding to that of the network-side device.

Figure 3:
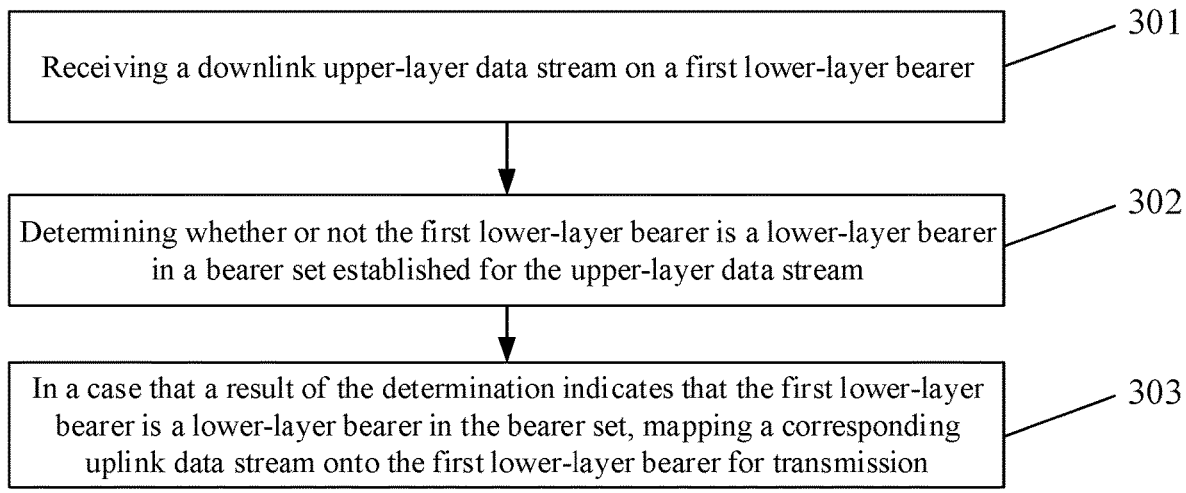
FIG. 3 is a flowchart of a data transmission method applied to a terminal according to some embodiments of the present disclosure.

Based on this, some embodiments of the present disclosure also provide a data transmission method that is applied to a terminal. As shown in FIG. 3, the method including steps 301-303.

Step 301: receiving a downlink upper-layer data stream on a first lower-layer bearer.

Step 302: determining whether or not the first lower-layer bearer is a lower-layer bearer in a bearer set established for the upper-layer data stream.

Here, the bearer set includes at least two lower-layer bearers.

The established bearer set is a set including available bearers. For the terminal, downlink data received on any one of the lower-layer bearers in the bearer set is considered to be reasonable data and needs to be received and processed.

In practical applications, bearer sets corresponding to a plurality of upper-layer data streams of the same user may coincide, intersect, or are completely different.

The coincidence and the intersection mean that there are several lower-layer bearers that may simultaneously carry multiple upper-layer data streams.

Each bearer in the bearer set may be a newly established bearer or may be a previously established bearer.

Step 303: in a case that a result of the determination indicates that the first lower-layer bearer is a lower-layer bearer in the bearer set, mapping a corresponding uplink data stream onto the first lower-layer bearer for transmission.

In practical application, inter-layer reflective mapping from an upper layer to a lower layer may include inter-layer reflective mapping of a radio access layer and inter-layer reflective mapping of a core layer.

The inter-layer reflective mapping of the radio access layer refers to reflective mapping from a QoS Flow to a DRB, in which the network-side device refers to a base station, such as a 5G base station (gNB), or the like. The inter-layer reflective mapping of the core layer refers to reflective mapping from an IP Flow to a QoS Flow, and in such a case, the network-side device refers to a core network device.

Based on this, in some embodiments, in a case that the upper-layer data stream is an IP flow, specific implementation of steps 302-303 includes determining whether or not the first lower-layer bearer is a QoS flow in a bearer set established for the IP flow; and in a case that a result of the determination indicates that the first lower-layer bearer is the QoS flow in the bearer set, mapping the corresponding uplink data stream onto the first lower-layer bearer for transmission.

In some embodiments, in a case that the upper-layer data stream is a QoS flow, specific implementation of the steps 302-303 includes: determining whether or not the first lower-layer bearer is a DRB in a bearer set established for the QoS flow; and in a case that a result of the determination indicates that the first lower-layer bearer is the DRB in the bearer set, mapping the corresponding uplink data stream onto the first lower-layer bearer for transmission.

In the data transmission method provided by some embodiments of the disclosure, the network-side device selects, according to a QoS requirement of a downlink upper-layer data stream, a lower-layer bearer from a bearer set established for the upper-layer data stream, the bearer set including at least two lower-layer bearers, and maps the upper-layer data stream onto the selected lower-layer bearer for transmission; the terminal receives the downlink upper-layer data stream on a first lower-layer bearer, determines whether or not the first lower-layer bearer is a lower-layer bearer in a bearer set established for the upper-layer data stream, and in a case that a result of the determination indicates that the first lower-layer bearer is the lower-layer bearer in the bearer set, the terminal maps a corresponding uplink data stream onto the first lower-layer bearer for transmission. That is, the network-side device selects an appropriate lower-layer bearer from available lower-layer bearer sets according to QoS requirement of the upper-layer data stream, and transmits downlink data on the selected lower-layer bearer; the terminal receives the downlink data on the lower-layer bearer selected by the network-side device, and sends corresponding uplink data on the lower-layer bearer selected by the network-side device. Thus, reflective mapping of an inter-layer data transmission channel is realized through a configuration set, and a mapping at the terminal side is realized through a downlink mapping at the network side.

In addition, a fast mapping is realized without carrying any channel-associated indication or channel-associated signaling, an overhead is reduced, and implementation of the technical solutions is simple.

The present disclosure is further described in detail below in connection with application examples.

Figure 4:
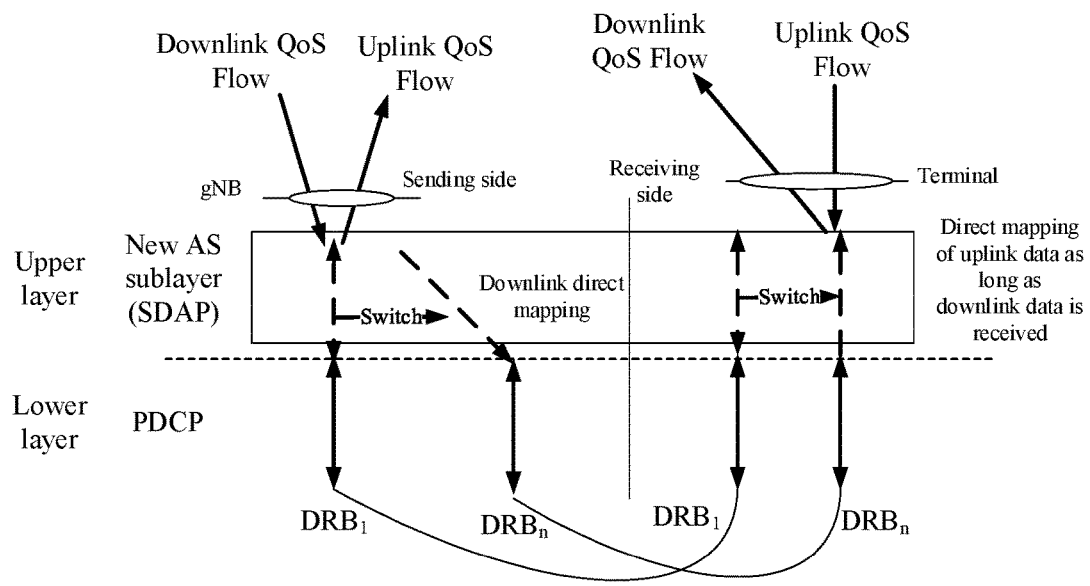
FIG. 4 is a schematic diagram of an inter-layer reflective mapping at a radio access side according to the present disclosure.

FIG. 4 shows a schematic diagram of inter-layer (from a QoS Flow to a DRB) reflective mapping at a radio access side (between a network-side device and a terminal).

An available bearer set generated at the radio access side is called a DRB Group, in which a plurality of available DRBs are included.

A service data adaptation protocol (SDAP) entity of the network-side device is responsible for mapping the QoS Flow to the DRB. Specifically, the SDAP entity generates an SDAP PDU according to the SDAP protocol after receiving a Protocol Data Unit (PDU) of the QoS Flow (also may be referred to as an SDAP Service Data Unit (SDU)) delivered from an upper layer, and delivers the SDAP PDU to a lower layer through the DRB according to a configured mapping relation between the QoS Flow and the DRB.

After the SDAP entity of the network-side device receives a reflective mapping indication of the QoS Flow given by a radio resource control (RRC) layer of the network-side device through a decision operation or given by the SDAP entity through a decision operation, the SDAP entity maps to-be-mapped downlink data of the QoS Flow directly to a specified target DRB for transmission.

In a case that the SDAP entity at the terminal side receives a packet indicated by a new QoS Flow ID on the DRB, and the DRB is within the DRB Group, the terminal side deduces that the network-side has initiated the reflective mapping, and the terminal side receives the packet correctly and sends an uplink data packet indicated by the new QoS Flow ID on the DRB.

In a case that the network-side device establishes the SDAP entity for the user, a DRB Group available to the user is established. During the establishment, procedures (such as a RRC Connection Setup Request/setup/completion/reconfiguration) corresponding to a RRC signaling may be used, or other means at Layer3/2 may be used, such as communication through a Media Access Control (MAC) control element (CE) or directly through a physical downlink control channel (PDCCH).

Figure 5:
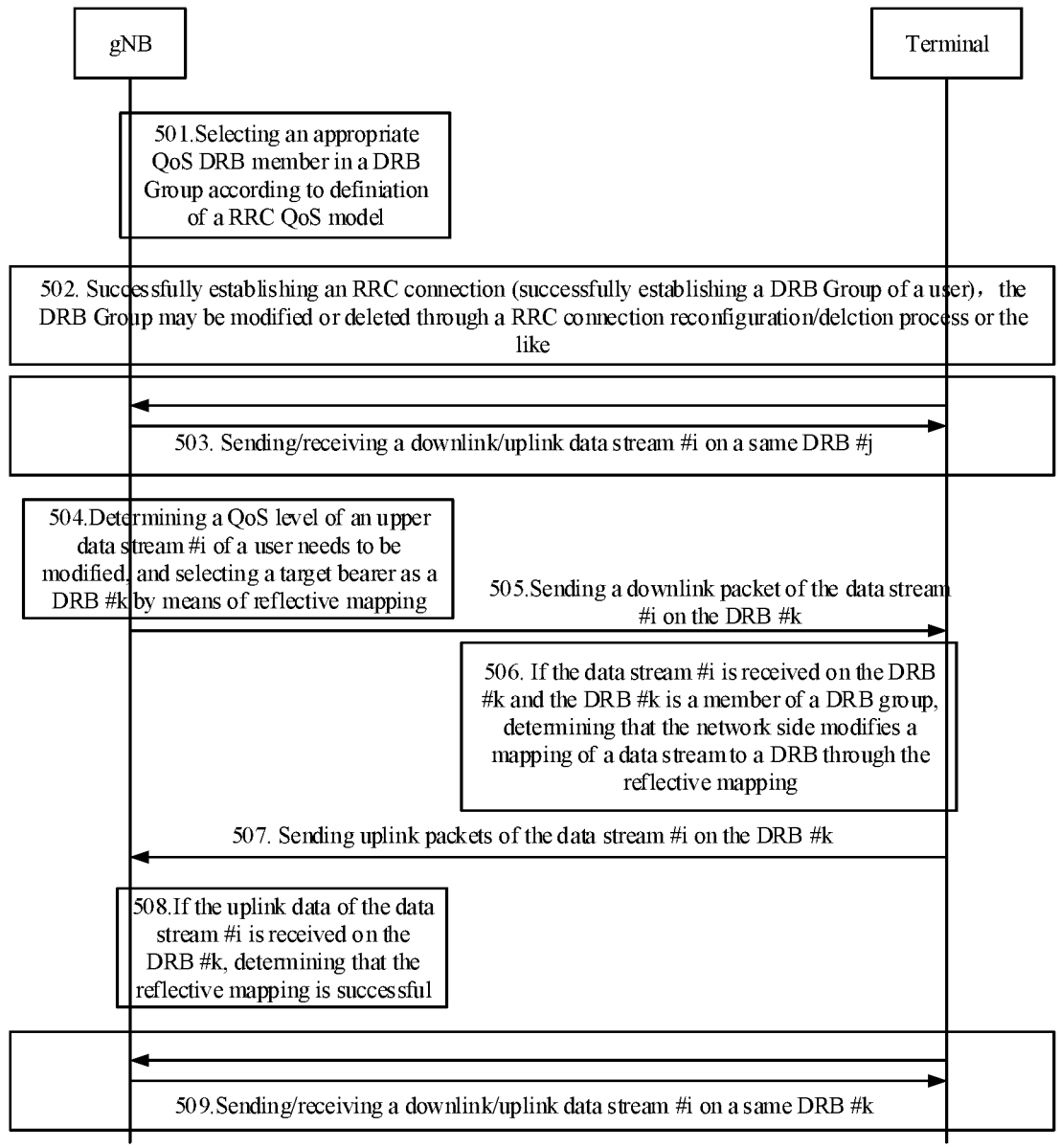
FIG. 5 is a schematic diagram of a reflective mapping procedure from a QoS flow to a DRB between a network-side device and a terminal side according to the present disclosure.

As shown in FIG. 5, a procedure of reflective mapping of a QoS Flow to a DRB between the network-side device (gNB) and the terminal side includes following steps 501-509.

Step 501: designing, by the gNB for a user, DRB types in a DRB Group according to system definition, and forming a configuration template. Thereafter, the step 502 is performed.

Step 502: when establishing a RRC connection of the user, selecting an appropriate DRB for the user according to the template of the DRB Group to form the DRB Group.

Here, the DRB Group may be modified and deleted through signaling procedures such as a RRC connection reconfiguration, a RRC connection deletion or the like.

Step 503: assuming that both uplink data and downlink data of a QoS Flow #i between the gNB and the terminal side are transmitted or received on the DRB #j during a service process. Thereafter, the step 504 is performed.

Steps 504 to 505: determining, by the RRC or the SDAP entity of the gNB, that a QoS level of the QoS Flow #i of the user needs to be modified, selecting, by the SDAP entity, an appropriate DRB #k from the DRB Group of the user, and sending downlink data of the QoS Flow #i on the DRB #k.

Here, if a decision at the RRC of the gNB indicates requirement of the reflective mapping, the RRC of the gNB notifies the SDAP entity of the gNB. Optionally, the SDAP autonomously judges that the reflective mapping is required.

In either decision by the RRC or the SDAP entity, in a case that a decision indication is notified to an execution module of the SDAP entity, the execution module of the SDAP entity firstly transmits a downlink data packet of the QoS Flow #i on the DRB #k while stopping transmission of any downlink data packet of the QoS Flow #i on the DRB #j.

Step 506: after the SDAP entity at the terminal side receives the data packet of the QoS Flow #i on the DRB #k, determining, by the SDAP entity at the terminal side, that the DRB #k is a member of the DRB Group, and in a case that a downlink data packet of the QoS Flow #i is previously transmitted on the DRB #j, determining that the reflective mapping is started at the network side.

Step 507: transmitting, by the SDAP entity at the terminal side, a subsequent uplink data packet of the QoS Flow #i on the DRB #k while stopping transmission on the DRB #j.

Step 508: receiving, by the SDAP entity of the gNB, uplink data of the QoS Flow #i on the DRB #k, and determining that the reflective mapping is successful.

Step 509: transmitting uplink data and transmitting downlink data of the QoS Flow #i simultaneously on the DRB #k.

Figure 6:
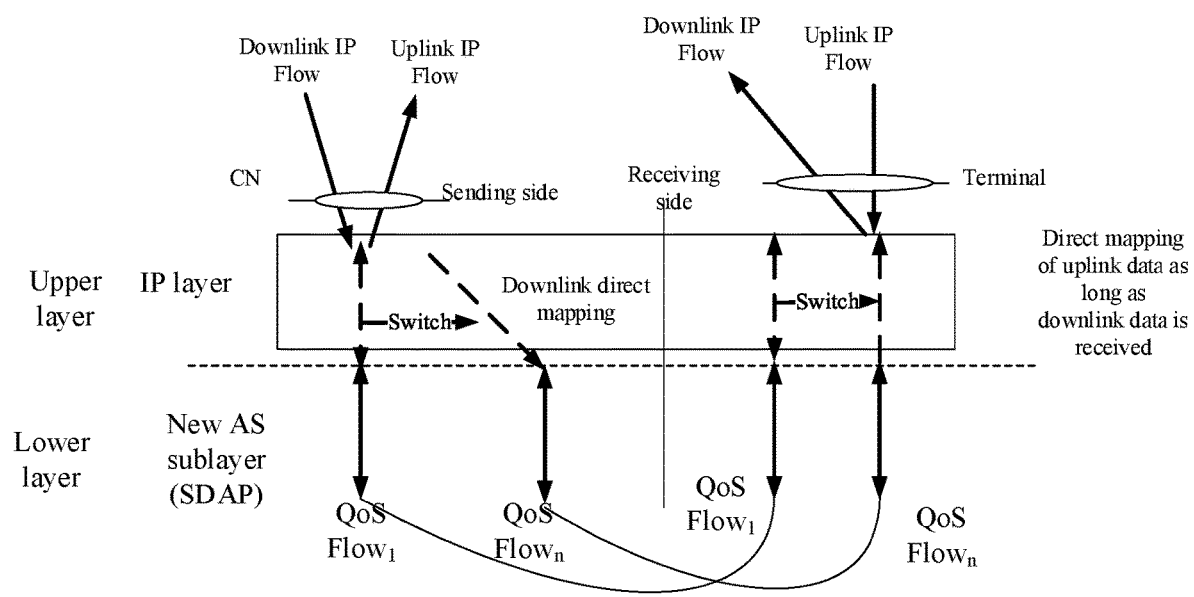
FIG. 6 is a schematic diagram of a non-inter-layer reflective mapping at a radio non-access side according to the present disclosure.

FIG. 6 shows a schematic diagram of inter-layer (an IP Flow to a QoS Flow) reflective mapping of a radio non-access layer (between a core network device and a terminal).

An available bearer set generated at the radio non-access side is called a QoS Flow Group, in which a number of available QoS Flows are included.

An IP layer of the network-side device is responsible for mapping of an IP Flow to a QoS Flow. Specifically, after the IP layer receives a packet delivered from an upper layer, the IP layer generates an IP packet and delivers the IP packet to a lower layer through the QoS Flow according to a configured mapping relation between the IP Flow and the QoS Flow.

In a case that the IP layer of the network-side device receives a reflective mapping indication of the IP flow given by other layers through decision or given by the IP layer through decision, the IP layer directly maps downlink data of the IP flow to a specified target QoS flow for transmission.

In a case that the IP layer of the terminal side receives a packet indicated by a new IP address on the QoS Flow and the QoS Flow is within the QoS Flow Group, the terminal side deduces that the network-side initiates the reflective mapping and the packet is correctly received. The terminal side sends an uplink packet having the new IP address on the QoS Flow.

In a case that the network side establishes a service channel for the user, a QoS Flow Group available to the user is established. During the establishment, the establishment may be performed by a non-access stratum (NAS) signaling.

Figure 7:
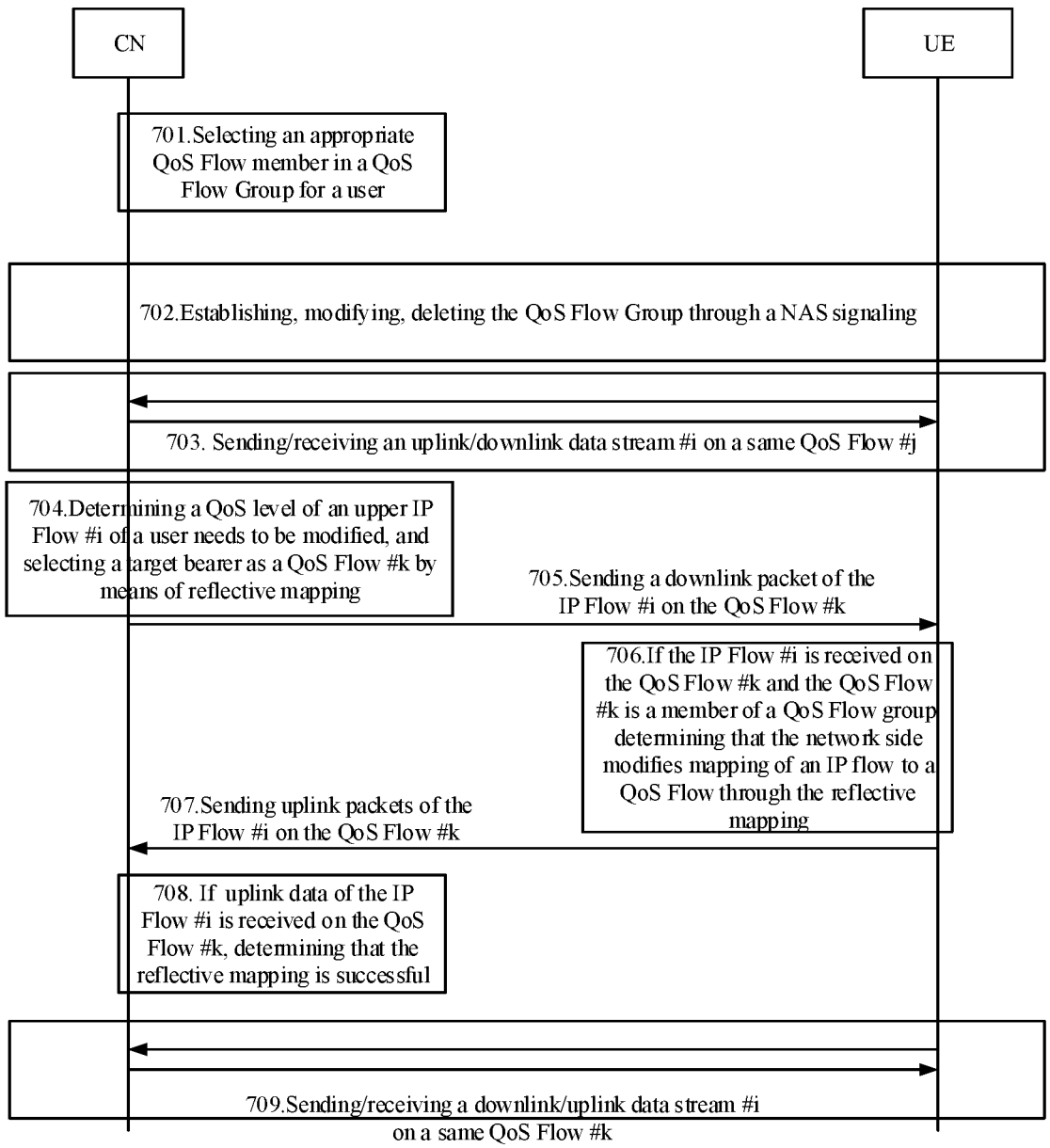
FIG. 7 is a schematic diagram of a reflective mapping procedure from an IP Flow to a QoS Flow between a network-side device and a terminal side according to the present disclosure.

As shown in FIG. 7, a procedure of reflective mapping of an IP Flow to a QoS Flow between a network-side device (a core network device) and the terminal side includes following steps 701-709.

Step 701: designing, by the core network device for a user, QoS Flow types in a QoS Flow Group according to system definition, and forming a configuration template. Thereafter, the step 702 is performed.

Step 702: establishing, by the core network device, a QoS Flow Group through a NAS signaling.

Here, the QoS Flow Group may be modified and deleted according to a subsequent operation.

Step 703: assuming that both uplink data and downlink data of an IP Flow #i between the core network device and the terminal side are transmitted or received on the QoS Flow #j during a service process. Thereafter, the step 704 is performed.

Steps 704 to 705: determining, by an IP-layer entity or another functional entity of the core network device, that a QoS level of the IP Flow #i of the user needs to be modified, selecting, by the IP-layer entity, an appropriate QoS Flow #k from the QoS Flow Group of the user, and sending downlink data of the IP Flow #i on the QoS Flow #k.

Here, in a case that a decision instruction is notified to an execution module at the IP layer, the execution module at the IP layer firstly transmits a downlink packet of the IP Flow #i on the QoS Flow #k while transmission of any downlink packet of the IP Flow #i on the QoS Flow #j is stopped.

Step 706: after the IP layer at the terminal side receives the data packet of the IP Flow #i on the QoS Flow #k, determining that the QoS Flow #k is a member of the QoS Flow Group, and in a case that a downlink data packet of the IP Flow #i is previously transmitted on the QoS Flow #j, determining that the reflective mapping is started at the network side.

Step 707: transmitting, by the IP layer at the terminal side, a subsequent uplink packet of the IP Flow #i on the QoS Flow #k while transmission on the QoS Flow #j is stopped.

Step 708: receiving, by the IP layer of the core network device, uplink data of the IP Flow #i on the QoS Flow #k, and determining that the reflective mapping is successful.

Step 709: transmitting uplink data and transmitting downlink data of the IP Flow #i simultaneously on the QoS Flow #k.

As may be seen from description of application examples, the technical solutions of some embodiments of the present disclosure have following advantages.

1. A transmission channel set is established, and in a case that reflection map is performed, a fast mapping is realized without carrying any channel-associated indication or channel-associated signaling, an overhead is reduced.

2. Operations on the transmission channel set are performed through procedures of service establishment, reconfiguration and deletion, implementation thereof is simple, robust, and is guaranteed.

3. Implementation at the network-side and at the terminal side is simple.

Figure 8:
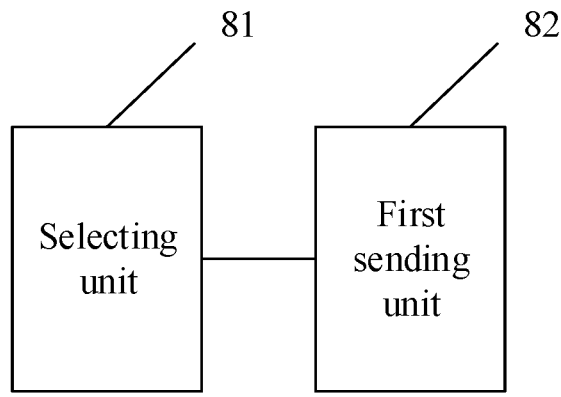
FIG. 8 is a schematic structural diagram of a data transmission apparatus according to some embodiments of the present disclosure.

In order to implement the methods of some embodiments of the present disclosure, some embodiments of the present disclosure provide a data transmission apparatus arranged at a network-side device. As shown in FIG. 8, the apparatus includes a selecting unit 81 and a first sending unit 82.

The selecting unit 81 is configured to select, according to a QoS requirement of a downlink upper-layer data stream, a lower-layer bearer from a bearer set established for the upper-layer data stream, wherein the bearer set includes at least two lower-layer bearers. The first sending unit 82 is configured to map the upper-layer data stream onto the selected lower-layer bearer for transmission.

In practical application, in order to realize the technical solutions of some embodiments of the present disclosure, in a case that an upper layer requires a lower layer to establish a lower-layer bearer channel for an upper-layer data stream, the network side simultaneously establishes, for the upper-layer data stream to the user, more than one lower-layer bearer (at least two lower-layer bearers) at a lower layer, i.e. establishes a bearer set available to the user. Each bearer within the bearer set may be a newly established bearer or a previously existing bearer being introduced.

Based on this, in some embodiments, the apparatus may further include a management unit, configured to establish at least two lower-layer bearers for the upper-layer data stream at a lower layer according to a QoS model; and utilize the established at least two lower-layer bearers to form the bearer set, wherein each of the lower-layer bearers corresponds to a QoS model.

As may be seen from the above description, different lower-layer bearers being established may meet QoS requirements of different upper-layer data streams.

In practical application, the number of low-level bearers being established should be determined according to QoS models given through a system research and a simulation. For example, according to the system research and the simulation, at most eight QoS models in the lower layer needed by a user may support service quality requirements of upper-layer data streams of the user. In a case that a service is established for the user, i.e., a lower-layer bearer is established, eight bearers respectively corresponding to various QoS models may be established simultaneously.

It is also possible to establish simultaneously a part (according to systematic analysis, quality of service models most commonly used by the users), for example, 4 lower-layer bearers, of the bearers. More lower-layer bearers may be established one by one subsequently.

It is also possible for the management unit to successfully establish a lower-layer bearer firstly, and then the management unit establishes at least one bearer by means of establishment, reconfiguration or the like so that the number of lower-layer bearers in the bearer set may meet the QoS requirements of the data streams. That is, a lower-layer bearer is firstly established by the management unit; after the lower-layer bearer is successfully established, at least one more lower-layer bearer is established through the establishment and/or the reconfiguration.

In addition, in practical application, the lower-layer bearers in the set may be updated according to the QoS model requirements of the system.

Based on this, in some embodiments, the management unit is further configured to update a lower-layer bearer in a reconfiguration process and/or a deletion process according to QoS model requirements during a service process to form a new bearer set; select a new lower-layer bearer in the new bearer set, and map the upper-layer data stream onto the new lower-layer bearer for transmission.

In practical application, inter-layer reflective mapping from an upper layer to a lower layer may include inter-layer reflective mapping of a radio access layer and inter-layer reflective mapping of a core layer (a non-radio access layer).

The inter-layer reflective mapping of the radio access layer refers to reflective mapping from a QoS Flow to a DRB, in which the network-side device refers to a base station, such as a 5G base station (gNB), or the like. The inter-layer reflective mapping of the core layer refers to reflective mapping from an IP Flow to a QoS Flow, and in such a case, the network-side device refers to a core network device.

Based on this, in some embodiments, the selecting unit 81 is specifically configured to select, according to a QoS requirement of the IP Flow, a QoS Flow from the bearer set established for the IP Flow. The first sending unit 82 is configured to map the IP Flow onto the selected QoS Flow for transmission.

In other embodiments, the selecting unit 81 is specifically configured to select, according to a QoS requirement of a QoS Flow, a DRB from the bearer set established for the QoS Flow. The first sending unit 82 is configured to map the QoS Flow onto the selected DRB for transmission.

In practical application, the selecting unit 81, the first sending unit 82 and the management unit may be implemented by a processor in the data transmission apparatus.

Figure 9:
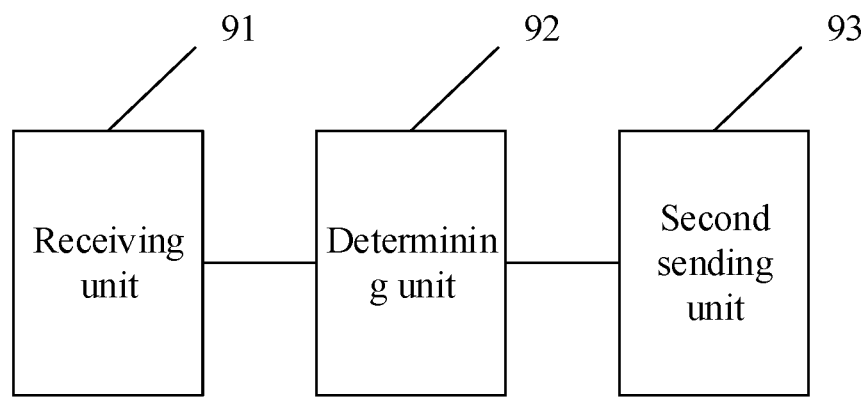
FIG. 9 is a schematic structural diagram of another data transmission apparatus according to some embodiments of the present disclosure.

In order to implement the methods of some embodiments of the present disclosure, some embodiments of the present disclosure also provide a data transmission apparatus arranged at a terminal. As shown in FIG. 9, the apparatus includes a receiving unit 91, a determining unit 92, and a second sending unit 93.

The receiving unit 91 is configured to receive a downlink upper-layer data stream on a first lower-layer bearer. The determining unit 92 is configured to determine whether or not the first lower-layer bearer is a lower-layer bearer in a bearer set established for the upper-layer data stream, wherein the bearer set includes at least two lower-layer bearers. The second sending unit 93 is configured to, in a case that a result of the determination indicates that the first lower-layer bearer is a lower-layer bearer in the bearer set, map a corresponding uplink data stream onto the first lower-layer bearer for transmission.

In practical application, inter-layer reflective mapping from an upper layer to a lower layer may include inter-layer reflective mapping of a radio access layer and inter-layer reflective mapping of a core layer.

The inter-layer reflective mapping of the radio access layer refers to reflective mapping from a QoS Flow to a DRB, in which the network-side device refers to a base station, such as a 5G base station (gNB), or the like. The inter-layer reflective mapping of the core layer refers to reflective mapping from an IP Flow to a QoS Flow, and in such a case, the network-side device refers to a core network device.

Based on this, in some embodiments, the determining unit 92 is configured to: in a case that the upper-layer data stream is an IP flow, determine whether or not the first lower-layer bearer is a QoS flow in a bearer set established for the IP flow. The second sending unit 93 is configured to: in a case that a result of the determination indicates that the first lower-layer bearer is the QoS flow in the bearer set, map the corresponding uplink data stream onto the first lower-layer bearer for transmission.

In some other embodiments, the determining unit 92 is configured to: in a case that the upper-layer data stream is a QoS flow, determine whether or not the first lower-layer bearer is a DRB in a bearer set established for the QoS flow. The sending unit 93 is configured to: in a case that a result of the determination indicates that the first lower-layer bearer is the DRB in the bearer set, map the corresponding uplink data stream onto the first lower-layer bearer for transmission.

In practical application, the receiving unit 91, the determining unit 92, and the second sending unit 93 may be implemented by a processor in the data transmission apparatus.

It should be noted that, an above exemplified division of program modules in the data transmission apparatus provided in the above embodiments is only illustrative when performing data transmission, and in practical application, the above-mentioned processing may be distributed to different ones of the program modules according to needs, i.e., an internal structure of the apparatus may be divided into different program modules to perform all or a part of the processing described above. In addition, the data transmission apparatus and the data transmission method provided in the above embodiments belong to the same concept, and a specific implementation process of the data transmission apparatus is detailed in the method embodiment, which will not be described here.

Figure 10:
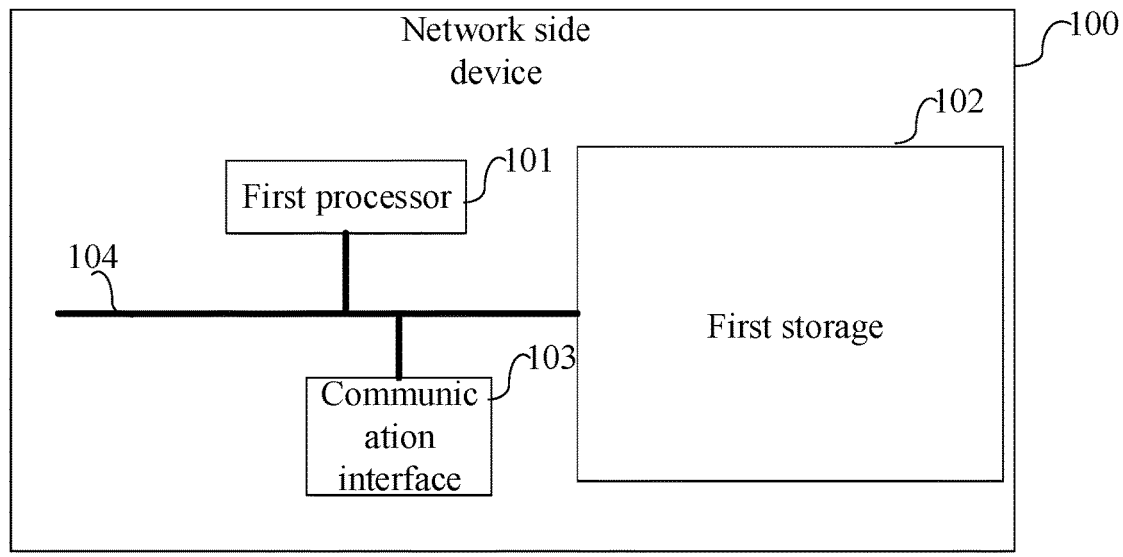
FIG. 10 is a schematic structural diagram of a network-side device according to some embodiments of the present disclosure.

Based on hardware implementation of the program modules described above, some embodiments of the present disclosure also provide a network-side device 100 for implementing methods of some embodiments of the present disclosure. As shown in FIG. 10, the device 100 includes a first processor 101 and a first storage 102 for storing a computer program executable by the first processor, wherein the first processor 101 is configured to, when executing the computer program, following steps: selecting, according to a QoS requirement of a downlink upper-layer data stream, a lower-layer bearer from a bearer set established for the upper-layer data stream, the bearer set including at least two lower-layer bearers; and mapping the upper-layer data stream onto the selected lower-layer bearer for transmission.

The first processor 101 is further configured to, when executing the computer program, perform following steps: establishing at least two lower-layer bearers for the upper-layer data stream at a lower layer according to a QoS model; and utilizing the established at least two lower-layer bearers to form the bearer set, wherein each of the lower-layer bearers corresponds to a QoS model.

The first processor 101 is further configured to, when executing the computer program, perform following steps: updating a lower-layer bearer in a reconfiguration process and/or a deletion process according to QoS model requirements, to form a new bearer set; selecting a new lower-layer bearer in the new bearer set; and mapping the upper-layer data stream onto the new lower-layer bearer for transmission.

The first processor 101 is further configured to, when executing the computer program, perform following steps: establishing a lower-layer bearer; and then establishing at least one more lower-layer bearer by means of establishment, reconfiguration or the like after the lower-layer bearer is established successfully.

Each bearer in the bearer set may be a newly established bearer or may be a previously established bearer.

Bearer sets corresponding to a plurality of upper data streams of the same user coincide, intersect, or are completely different.

The first processor 101 is further configured to, when executing the computer program, perform following steps: selecting, according to a QoS requirement of the IP Flow, a QoS Flow from the bearer set established for the IP Flow; and mapping the IP Flow onto the selected QoS Flow for transmission.

The first processor 101 is further configured to, when executing the computer program, perform following steps: selecting, according to a QoS requirement of a QoS Flow, a Data Radio Bearer (DRB) between a terminal and a base station from the bearer set established for the QoS Flow; and mapping the QoS Flow onto the selected DRB for transmission.

Of course, in practical application, as shown in FIG. 10, the device 100 may further include a communication interface 103. Various components in the device 100 are coupled together by a bus system 104. It will be appreciated that the bus system 103 is used to enable connection communication among these components. The bus system 104 includes a data bus, a power bus, a control bus, and a status signal bus. However, for clarity of illustration, various buses are designated as the bus system 104 in FIG. 10.

The first storage 102 in some embodiments of the present disclosure is used to store various types of data to support an operation of the device 100.

The communication interface 103 is used for communication between the network-side device 100 and the terminal.

The method disclosed by some embodiments of the present disclosure described above may be applied to, or implemented by, the first processor 101. The first processor 101 may be an integrated circuit chip having signal processing capability. In implementation, the steps of the method described above may be accomplished by integrated logic circuitry of hardware in the first processor 101 or by instructions in a form of software. The first processor 101 described above may be a general purpose processor, a Digital Signal Processor (DSP), or other programmable logic devices, discrete gates or transistor logic devices, discrete hardware components, or the like. The first processor 101 may implement or perform the methods, steps, and logic blocks disclosed in some embodiments of the present disclosure. The general purpose processor may be a microprocessor or any conventional processor or the like. The steps of the method disclosed in connection with some embodiments of the present disclosure may be embodied directly as execution by a hardware decoding processor, or may be performed by a combination of hardware in the decoding processor and software modules. The software modules may be stored in a storage medium in the first storage 102, and the first processor 101 reads information in the first storage 102, and performs the steps of the foregoing method in conjunction with hardware of the first processor 101.

In an exemplary embodiment, the device 100 may be implemented by one or more of Application Specific Integrated Circuits (ASICs), DSPs, Programmable Logic Devices (PLD), Complex Programmable Logic Devices (CPLDs), Field-Programmable Gate Arrays (FPGAs), a general purpose processor, a controller, a Micro Controller Unit (MCU), a microprocessor, or other electronic components, to perform aforementioned method performed by the network-side device.

Figure 11:
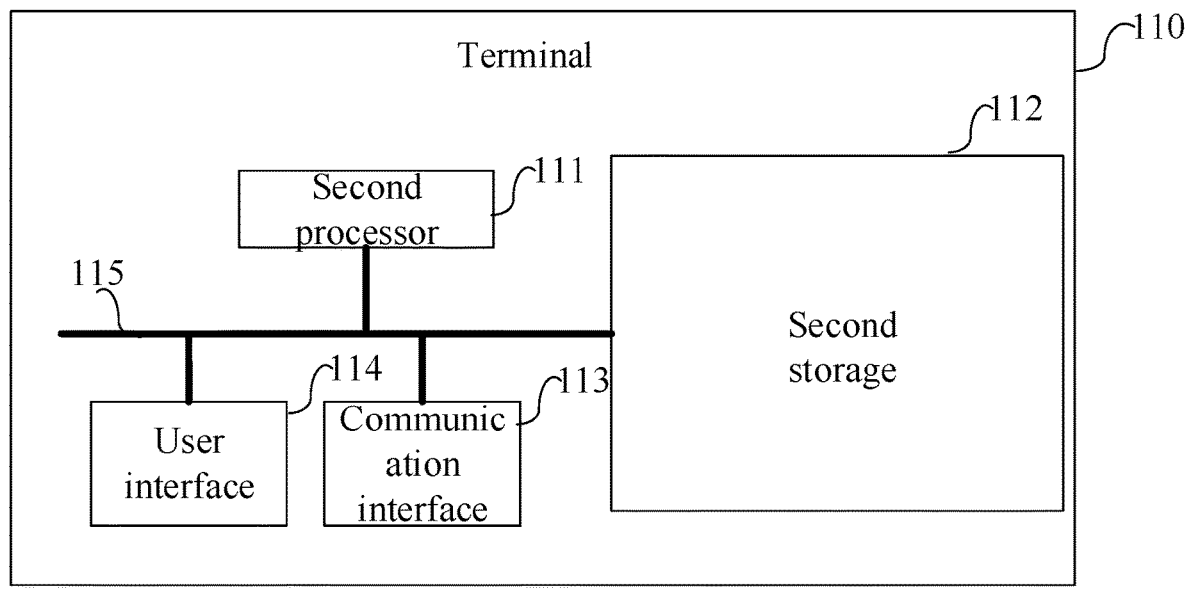
FIG. 11 is a schematic structural diagram of a terminal according to some embodiments of the present disclosure.

To implement the methods of some embodiments of the present disclosure, some embodiments of the present disclosure provide a terminal 110. As shown in FIG. 11, the terminal 110 includes a second processor 111 and a second storage 112 for storing a computer program executable by the second processor.

The second processor 111 is configured to, in a case that the second processor 111 executes the computer program, receive a downlink upper-layer data stream on a first lower-layer bearer; determine whether or not the first lower-layer bearer is a lower-layer bearer in a bearer set established for the upper-layer data stream, the bearer set including at least two lower-layer bearers; and in a case that a result of the determination indicates that the first lower-layer bearer is a lower-layer bearer in the bearer set, map a corresponding uplink data stream onto the first lower-layer bearer for transmission.

Each bearer in the bearer set may be a newly established bearer or may be a previously established bearer.

The bearer sets corresponding to a plurality of upper-layer data streams of the same user may coincide, intersect, or does not intersect at all.

The upper-layer data stream is an IP flow; the second processor 111 is configured to, in a case that the second processor 111 executes the computer program, perform following steps: determining whether or not the first lower-layer bearer is a QoS flow in a bearer set established for the IP flow; and in a case that a result of the determination indicates that the first lower-layer bearer is the QoS flow in the bearer set, mapping the corresponding uplink data stream onto the first lower-layer bearer for transmission.

The upper-layer data stream is a QoS flow; the second processor 111 is configured to, in a case that the second processor 111 executes the computer program, perform following steps: determining whether or not the first lower-layer bearer is a DRB in a bearer set established for the QoS flow; and in a case that a result of the determination indicates that the first lower-layer bearer is the DRB in the bearer set, mapping the corresponding uplink data stream onto the first lower-layer bearer for transmission.

Of course, in practical application, as shown in FIG. 11, the terminal 110 may further include a communication interface 113 and a user interface 114. Various components in the terminal 110 are coupled together by a bus system 115. It will be appreciated that the bus system 103 is used to enable connection communication among these components. The bus system 115 includes a data bus, a power bus, a control bus, and a status signal bus. However, for clarity of illustration, various buses are designated as the bus system 115 in FIG. 11.

The second storage 112 in some embodiments of the present disclosure is used to store various types of data to support an operation of the terminal 110.

The user interface 114 may include a display, a keyboard, a mouse, a trackball, a click wheel, a key, a button, a touch pad, a touch screen, or the like.

The communication interface 113 is used to enable the terminal 110 to communicate with the network-side device.

The method disclosed by some embodiments of the present disclosure described above may be applied to, or implemented by, the second processor 111. The second processor 111 may be an integrated circuit chip having signal processing capability. In implementation, steps of the method described above may be accomplished by integrated logic circuitry of hardware in the second processor 111 or by instructions in form of software. The second processor 111 described above may be a general purpose processor, a DSP, or another programmable logic device, discrete gates or transistor logic devices, discrete hardware components, or the like. The second processor 111 may implement or perform the methods, steps, and logic blocks disclosed in some embodiments of the present disclosure. The general purpose processor may be a microprocessor or any conventional processor or the like. The steps of the method disclosed in connection with some embodiments of the present disclosure may be embodied directly as execution by a hardware decoding processor, or may be performed by a combination of hardware in the decoding processor and software modules. The software modules may be stored in a storage medium in the second storage 112, and the second processor 111 reads information in the second storage 112, and performs the steps of the foregoing method in conjunction with hardware of the second processor 111.

In an exemplary embodiment, that terminal 110 may be implemented by one or more of ASICs, DSP, PLD, CPLD, FPGA, general purpose processor, controller, MCU, microprocessor, or other electronic components to perform aforementioned method.

It will be appreciated that the storages in some embodiments of the present disclosure, such as the first storage 102 and the second storage 112, may be volatile storages or non-volatile storages, or may include both volatile storages and non-volatile storages. The non-volatile storages may be a Read Only memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a Flash Memory, a Magnetic Surface Memory, an Optical Disk, or Compact Disc Read-Only Memory (CD-ROM); the Magnetic Surface Memory may be a magnetic disk memory or a magnetic tape memory. The volatile storage may be a Random Access Memory (RAM), which serves as an external cache. By way of example, but not limitation, many forms of RAM may be used, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAIVI), and a Direct Rambus Random Access Memory (DRRAM). The storages described by some embodiments of the present disclosure are intended to include, but are not limited to, these and any other suitable types of storages.

In exemplary embodiments, some embodiments of the present disclosure also provide a computer-readable storage medium, including such as a first storage 102 storing a computer program. The computer program may be executed by the first processor 101 of the network-side device 100 to complete the steps of the aforementioned method. Optionally, the computer-readable storage medium includes a second storage 112 for storing a computer program, the computer program is executable by the second processor 111 of the terminal 110 to perform the steps described in the foregoing method.

That is, some embodiments of the present disclosure provide a computer-readable storage medium having stored thereon a computer program. When the computer program is executed by a processor, the processor implements the steps of the method of the network-side device described above, or the steps of the method of the terminal side.

It should be noted that the computer-readable storage media provided by some embodiments of the present disclosure may be storages such as the FRAM, the ROM, the PROM, the EPROM, the EEPROM, the Flash Memory, the magnetic surface memory, an optical disk, or a CD-ROM, or may be one or any combination of the above storages.

The foregoing are optional embodiments of the present disclosure and are not intended to limit the protection scope of the present disclosure.

What is claimed is:

1. A data transmission method, comprising:
    selecting, according to Quality of Service (QoS) requirement of a downlink upper-layer data stream, a lower-layer bearer from a bearer set established for the upper-layer data stream, the bearer set comprising at least two lower-layer bearers, wherein the lower-layer bearers in the bearer set are updated according to the QoS requirement;
    mapping the upper-layer data stream onto the selected lower-layer bearer for transmission.

2. The method according to claim 1, further comprising:
    establishing at least two lower-layer bearers for the upper-layer data stream at a lower layer according to a QoS model; and
    utilizing the established at least two lower-layer bearers to form the bearer set, wherein each of the lower-layer bearers corresponds to a QoS model.

3. The method according to claim 2, further comprising:
    updating a lower-layer bearer in a reconfiguration process and/or a deletion process according to QoS model requirement, to form a new bearer set;
    selecting a new lower-layer bearer in the new bearer set, and mapping the upper-layer data stream onto the new lower-layer bearer for transmission.

4. The method according to claim 2, wherein, establishing the at least two lower-layer bearers for the upper-layer data stream at the lower layer according to the QoS model, comprising:
    establishing a lower-layer bearer; and
    establishing at least one more lower-layer bearer through an establishment process and/or a reconfiguration process after successfully establishing the lower-layer bearer.

5. The method according to claim 1, wherein each bearer in the bearer set is a newly established bearer or a previously established bearer.

6. The method according to claim 1, wherein bearer sets corresponding to a plurality of upper-layer data streams of a same user coincide, or intersect, or are completely different.

7. The method according to claim 1, wherein selecting, according to the QoS requirement of the downlink upper-layer data stream, the lower-layer bearer from the bearer set established for the upper-layer data stream, and mapping the upper-layer data stream onto the selected lower-layer bearer for transmission, comprises:
    selecting, according to QoS requirement of an Internet Protocol (IP) Flow, a QoS Flow from a bearer set established for the IP Flow; and
    mapping the IP Flow onto the selected QoS Flow for transmission.

8. The method according to claim 1, wherein, selecting, according to the QoS requirement of the downlink upper-layer data stream, the lower-layer bearer from the bearer set established for the upper-layer data stream, and mapping the upper-layer data stream onto the selected lower-layer bearer for transmission, comprises:
    selecting, according to QoS requirement of a QoS flow, a data radio bearer (DRB) between a terminal and a base station from a bearer set established for the QoS flow;
    mapping the QoS flow onto the selected DRB for transmission.

9. A network-side device, comprising:
    a first processor, a first storage, and a computer program stored on the first storage and executable by the first processor;
        wherein the first processor is configured to, in a case that the first processor executes the computer program, execute the steps of the method according to claim 1.

10. The network-side device according to claim 9, wherein, the first processor is further configured to, in a case that the first processor executes the computer program, execute following steps:
    establishing at least two lower-layer bearers for the upper-layer data stream at a lower layer according to a QoS model; and
    utilizing the established at least two lower-layer bearers to form the bearer set, wherein each of the lower-layer bearers corresponds to a QoS model.

11. The network side device according to claim 10, wherein, the first processor is further configured to, in a case that the first processor executes the computer program, execute following steps:
    updating a lower-layer bearer in a reconfiguration process and/or a deletion process according to QoS model requirement, to form a new bearer set;
    selecting a new lower-layer bearer in the new bearer set, and mapping the upper-layer data stream onto the new lower-layer bearer for transmission.

12. The network side device according to claim 10, establishing the at least two lower-layer bearers for the upper-layer data stream at the lower layer according to the QoS model, comprising:
    establishing a lower-layer bearer; and
    establishing at least one more lower-layer bearer through an establishment process and/or a reconfiguration process after successfully establishing the lower-layer bearer.

13. A data transmission method, comprising:
receiving a downlink upper-layer data stream on a first lower-layer bearer;
determining whether or not the first lower-layer bearer is a lower-layer bearer in a bearer set established for the upper-layer data stream, the bearer set comprising at least two lower-layer bearers, wherein the lower-layer bearers in the bearer set are updated according to the QoS requirement; and
mapping a corresponding uplink data stream onto the first lower-layer bearer for transmission in a case that a result of the determination indicates that the first lower-layer bearer is a lower-layer bearer in the bearer set.

14. The method according to claim 13, wherein each bearer in the bearer set is a newly established bearer or a previously established bearer.

15. The method according to claim 13, wherein bearer sets corresponding to a plurality of upper-layer data streams of a same user coincide, or intersect, or are completely different.

16. The method according to claim 13, wherein the upper-layer data stream is an Internet Protocol (IP) stream,
determining whether or not the first lower-layer bearer is the lower-layer bearer in the bearer set established for the upper-layer data stream, and mapping the corresponding uplink data stream onto the first lower-layer bearer for transmission in a case that the result of the determination indicates that the first lower-layer bearer is the lower-layer bearer in the bearer set, comprises:
determining whether or not the first lower-layer bearer is a Quality of Service (QoS) flow in a bearer set established for the IP flow; and
in a case that a result of the determination indicates that the first lower-layer bearer is the QoS flow in the bearer set, mapping the corresponding uplink data stream onto the first lower-layer bearer for transmission.

17. The method according to claim 13, wherein the upper-layer data stream is a Quality of Service (QoS) stream,
determining whether or not the first lower-layer bearer is the lower-layer bearer in the bearer set established for the upper-layer data stream, and mapping the corresponding uplink data stream onto the first lower-layer bearer for transmission in a case that the result of the determination indicates that the first lower-layer bearer is the lower-layer bearer in the bearer set, comprises:
determining whether or not the first lower-layer bearer is a Data Radio Bearer (DRB) in a bearer set established for the QoS flow; and
mapping the corresponding uplink data stream onto the first lower-layer bearer for transmission, in a case that the result of the determination indicates that the first lower-layer bearer is the DRB in the bearer set.

18. A terminal, comprising:
a processor, a storage, and a computer program stored on the storage and executable by the processor;
wherein the processor is configured to, in a case that the processor executes the computer program, execute the steps of the method according to claim 13.

19. The terminal according to claim 18, wherein, the upper-layer data stream is an Internet Protocol (IP) stream,
determining whether or not the first lower-layer bearer is the lower-layer bearer in the bearer set established for the upper-layer data stream, and mapping the corresponding uplink data stream onto the first lower-layer bearer for transmission in a case that the result of the determination indicates that the first lower-layer bearer is the lower-layer bearer in the bearer set, comprises:
determining whether or not the first lower-layer bearer is a Quality of Service (QoS) flow in a bearer set established for the IP flow; and
in a case that a result of the determination indicates that the first lower-layer bearer is the QoS flow in the bearer set, mapping the corresponding uplink data stream onto the first lower-layer bearer for transmission.

20. The terminal according to claim 18, wherein, the upper-layer data stream is a Quality of Service (QoS) stream,
determining whether or not the first lower-layer bearer is the lower-layer bearer in the bearer set established for the upper-layer data stream, and mapping the corresponding uplink data stream onto the first lower-layer bearer for transmission in a case that the result of the determination indicates that the first lower-layer bearer is the lower-layer bearer in the bearer set, comprises:
determining whether or not the first lower-layer bearer is a Data Radio Bearer (DRB) in a bearer set established for the QoS flow; and
mapping the corresponding uplink data stream onto the first lower-layer bearer for transmission, in a case that the result of the determination indicates that the first lower-layer bearer is the DRB in the bearer set.

* * * * *